(12) United States Patent
Seo

(10) Patent No.: US 12,447,619 B2
(45) Date of Patent: Oct. 21, 2025

(54) REBOT CONTROL METHOD USING NON-CONTACT DISPLACEMENT SENSOR AND APPARATUS THEREOF

(71) Applicant: GSF SOLUTION CO., LTD., Chungcheongbuk-do (KR)

(72) Inventor: Seung Won Seo, Gyeonggi-do (KR)

(73) Assignee: GSF SOLUTION CO., LTD., Chungcheongbuk-Do (KR)

( * ) Notice: Subject to any disclaimer, the term of this patent is extended or adjusted under 35 U.S.C. 154(b) by 101 days.

(21) Appl. No.: 18/407,594

(22) Filed: Jan. 9, 2024

(65) Prior Publication Data
US 2024/0227186 A1 Jul. 11, 2024

(30) Foreign Application Priority Data

Jan. 9, 2023 (KR) .......................... 10-2023-0002695

(51) Int. Cl.
| | | |
|---|---|---|
| *B25J 9/16* | (2006.01) | |
| *B25J 13/08* | (2006.01) | |
| *B25J 19/02* | (2006.01) | |
| *H01L 21/68* | (2006.01) | |

(52) U.S. Cl.
CPC ........... *B25J 9/1664* (2013.01); *B25J 9/1692* (2013.01); *B25J 19/022* (2013.01); *H01L 21/681* (2013.01)

(58) Field of Classification Search
CPC ...... B25J 9/1664; B25J 9/1692; B25J 19/022; B25J 9/16; B25J 13/08; H01L 21/681
See application file for complete search history.

(56) References Cited

U.S. PATENT DOCUMENTS

| | | | | |
|---|---|---|---|---|
| 6,085,125 A | * | 7/2000 | Genov | ................... H01L 21/681 414/744.1 |
| 11,969,947 B2 | * | 4/2024 | Hetrich | ................. B29C 64/209 |
| 2004/0033761 A1 | * | 2/2004 | Ono | ........................ B24B 49/16 451/8 |
| 2013/0325179 A1 | * | 12/2013 | Liao | ........................ B25J 9/1697 700/254 |
| 2015/0202774 A1 | * | 7/2015 | Blank | ................... H01L 21/673 700/254 |
| 2018/0001478 A1 | * | 1/2018 | Freeman | ................ B25J 9/1692 |

FOREIGN PATENT DOCUMENTS

| | | |
|---|---|---|
| JP | 2001338966 A | 12/2001 |
| KR | 20020073318 A | 9/2002 |
| KR | 20210052778 A | 5/2021 |

* cited by examiner

*Primary Examiner* — Harry Y Oh
(74) *Attorney, Agent, or Firm* — Panitch Schwarze Belisario & Nadel LLP

(57) ABSTRACT

The present invention discloses a robot control method using a non-contact displacement sensor, and an apparatus thereof. The robot control method using a non-contact displacement sensor may comprise steps of: checking a normal position according to a robot's motion range through the non-contact displacement sensor installed horizontally to an end effector of the robot; measuring displacement with respect to the end effector to obtain displacement data when a product is transferred by the robot; obtaining vibration data through a vibration sensor coupled to the robot; checking whether an abnormal state exists using the obtained data; and transmitting an adjustment value to correct displacement distortion of the robot when the robot is confirmed to be in the abnormal state.

15 Claims, 11 Drawing Sheets

[Figure 1]
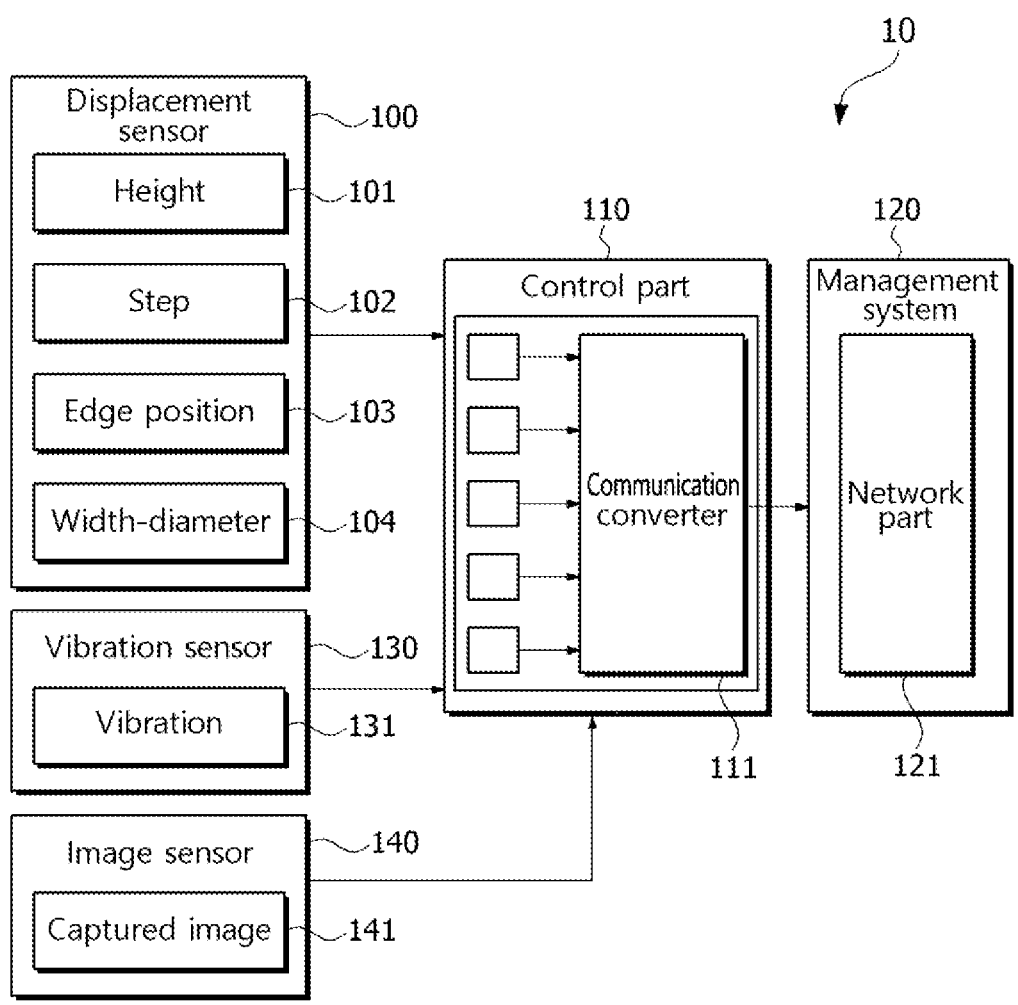

[Figure 2]
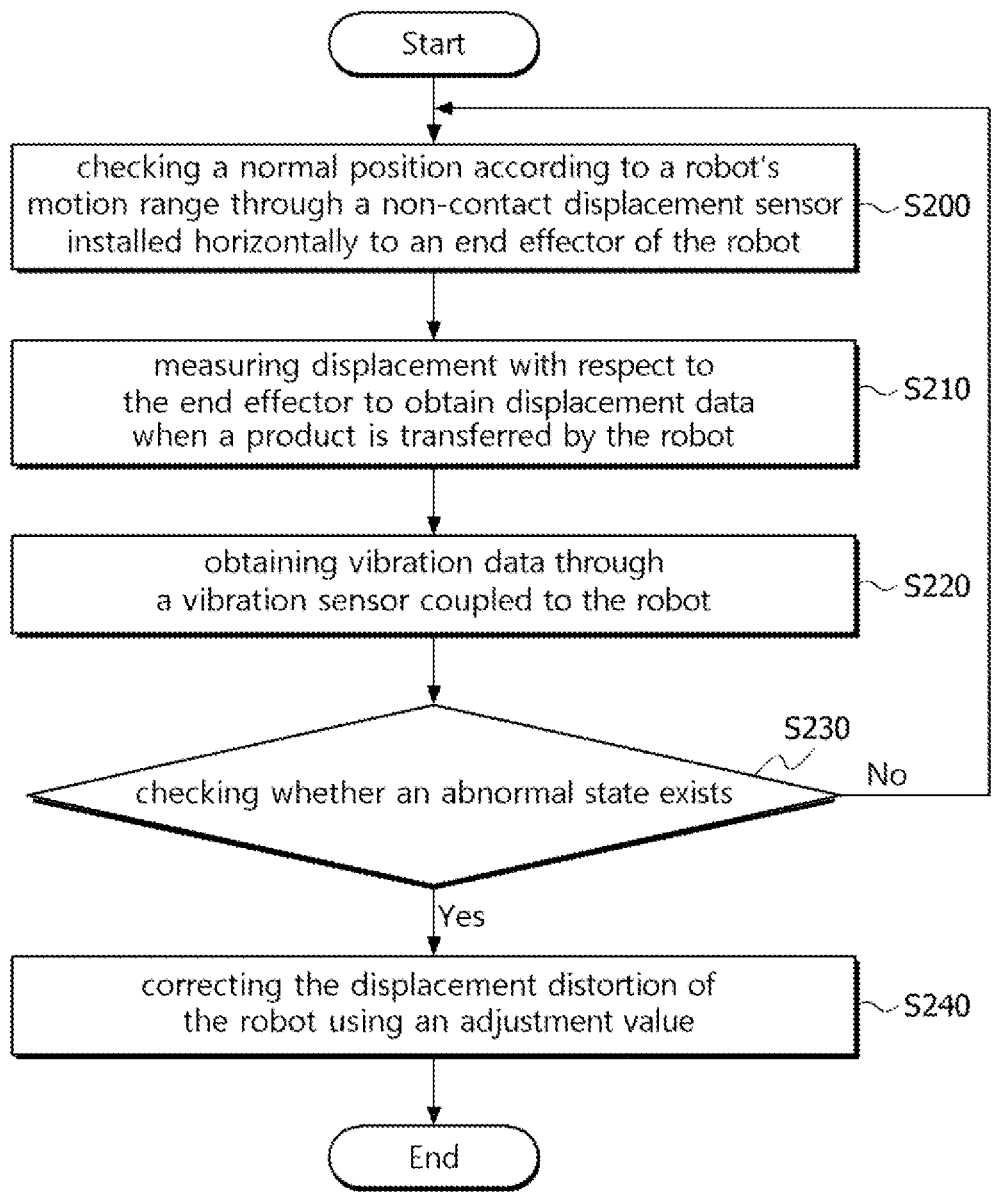

[Figure 3A]
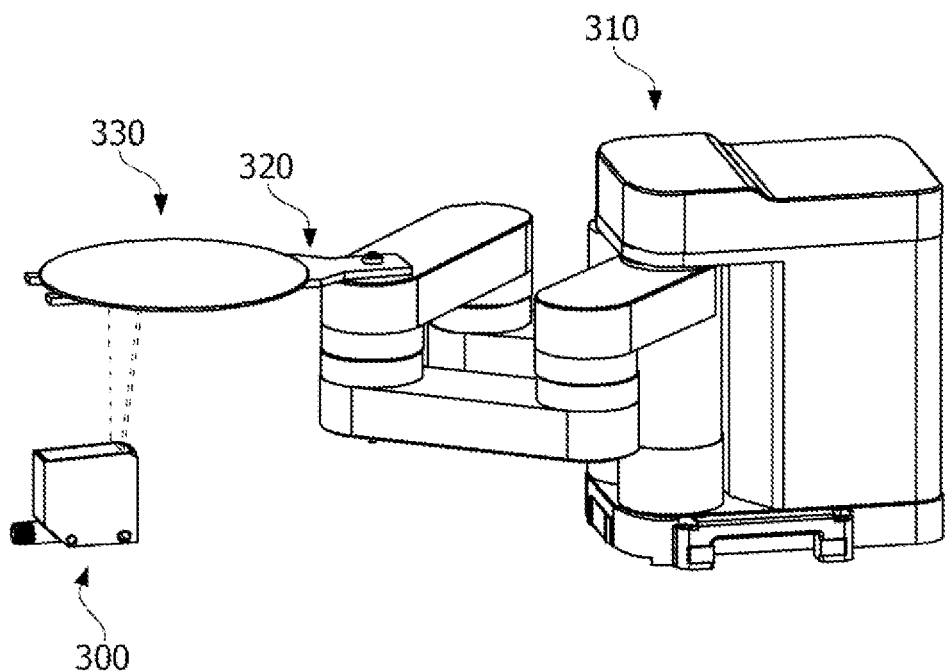

[Figure 3B]
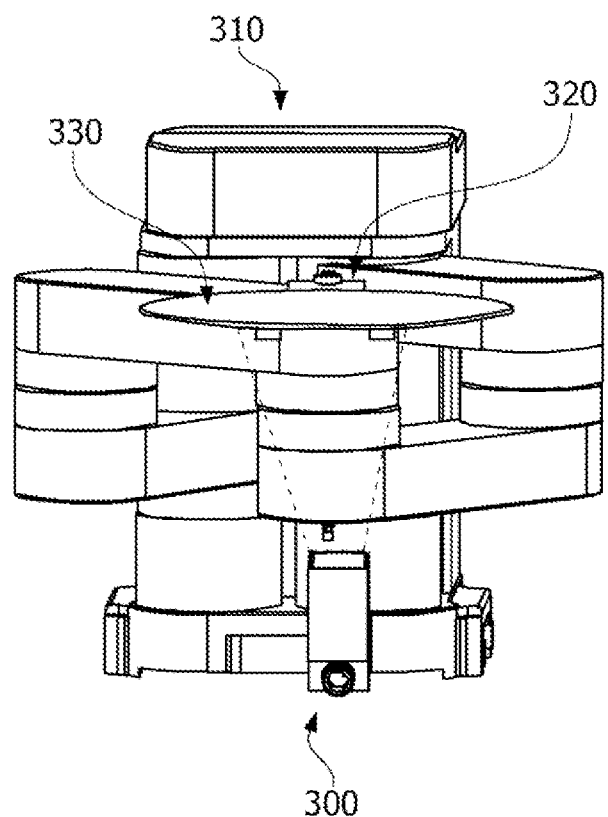

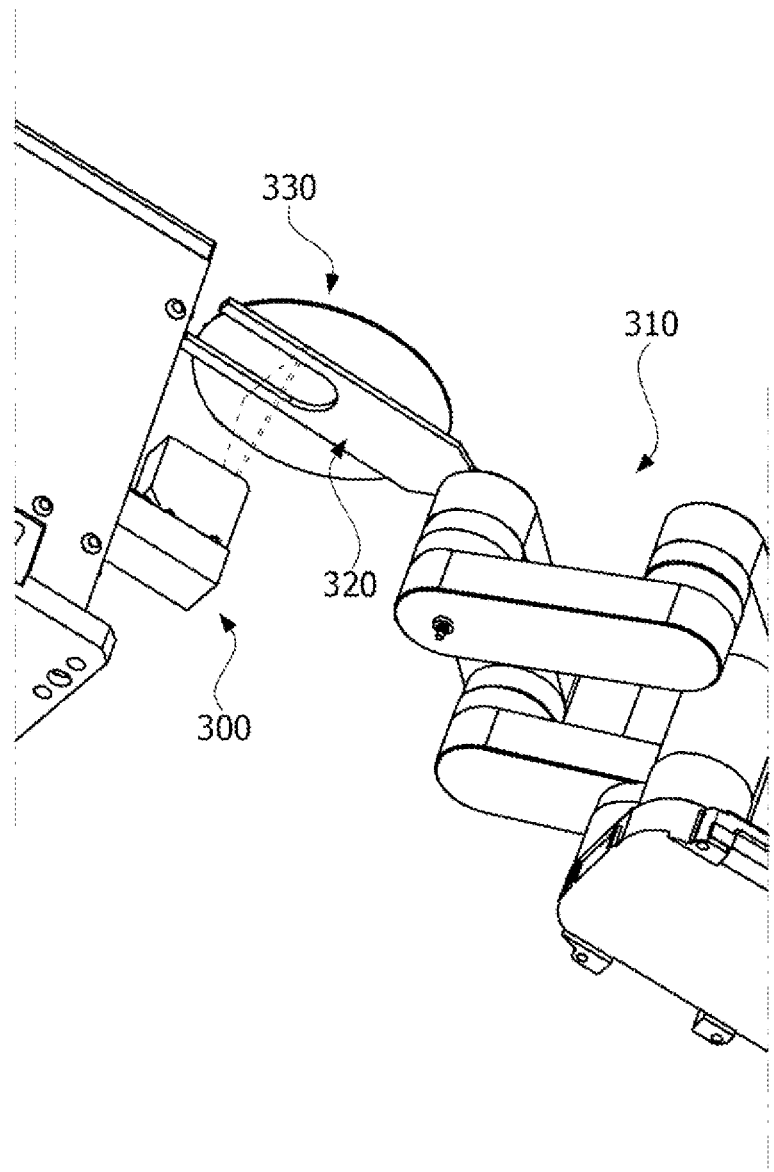
[Figure 3C]

[Figure 4]
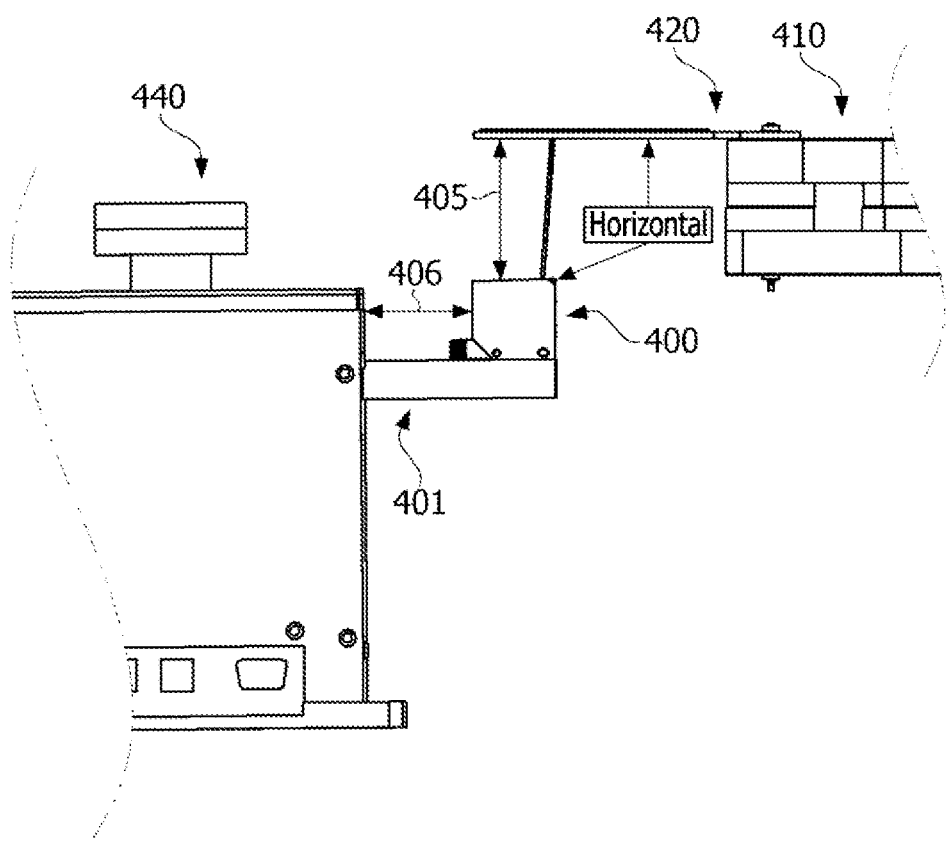

[Figure 5]
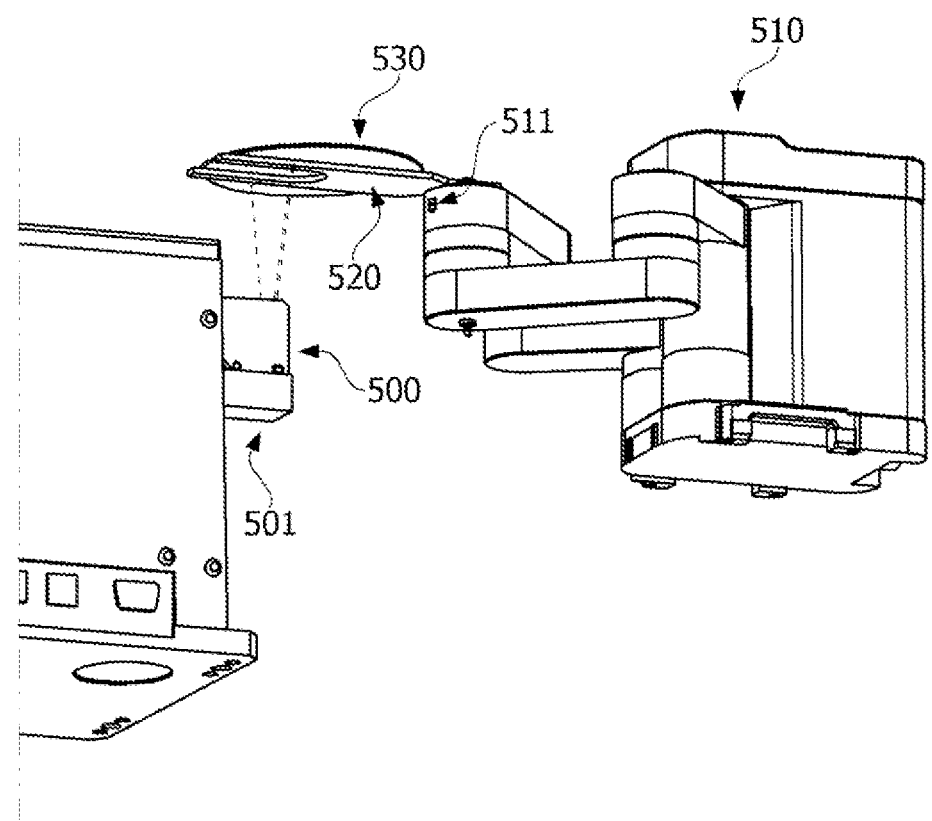

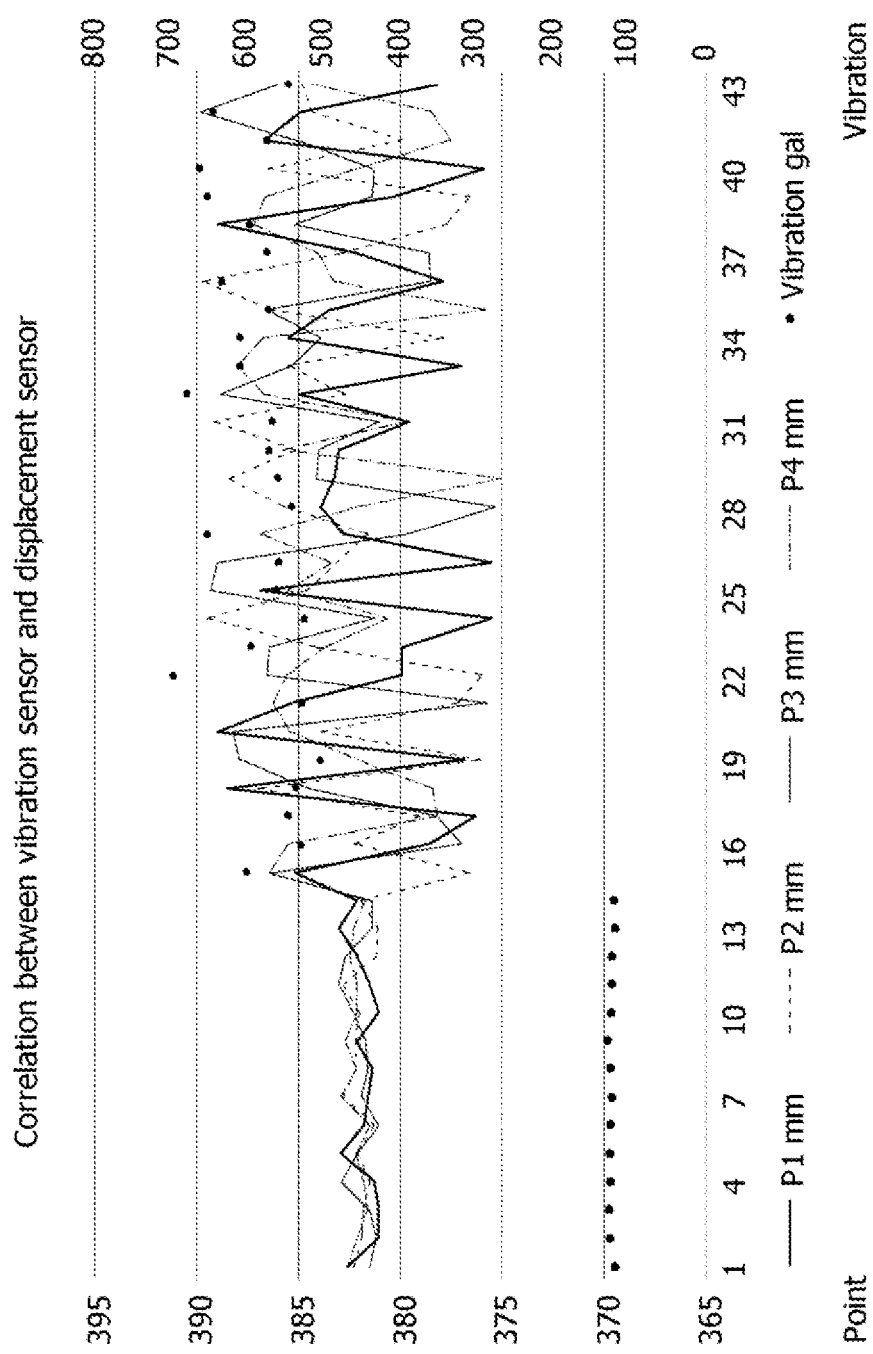
[Figure 6]

[Figure 7]
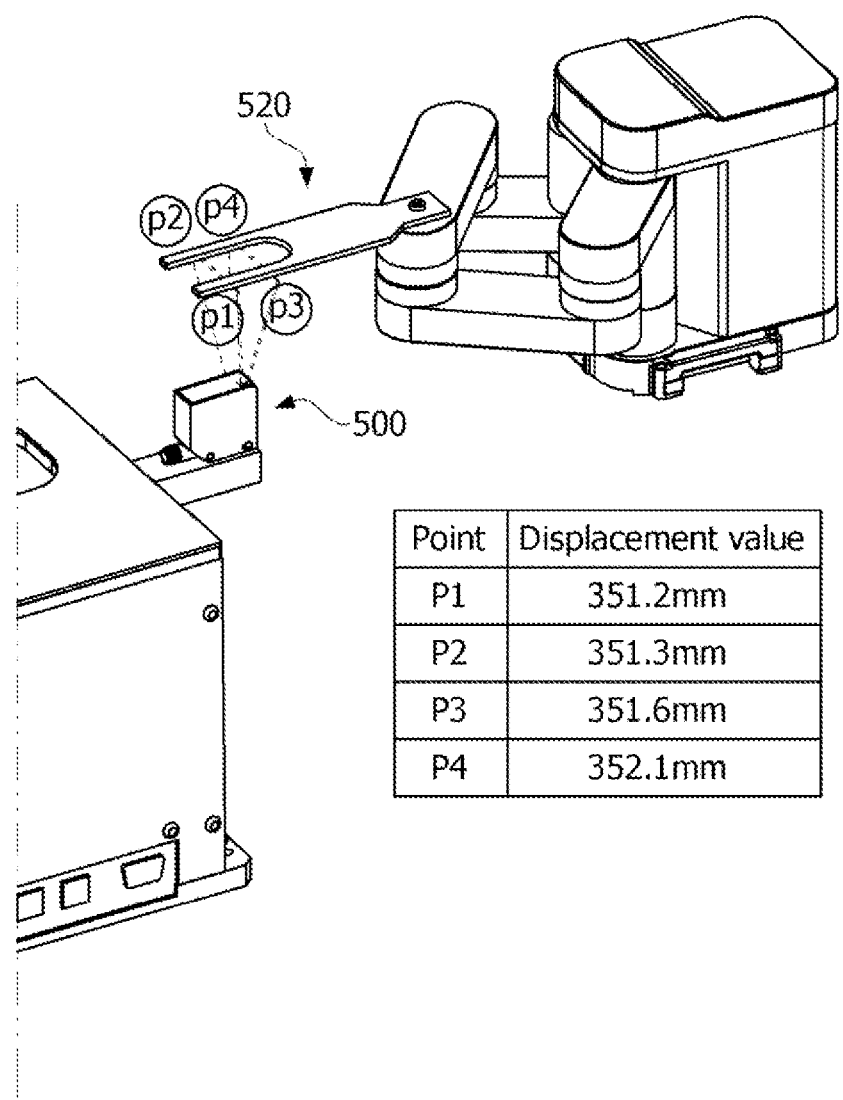

[Figure 8]
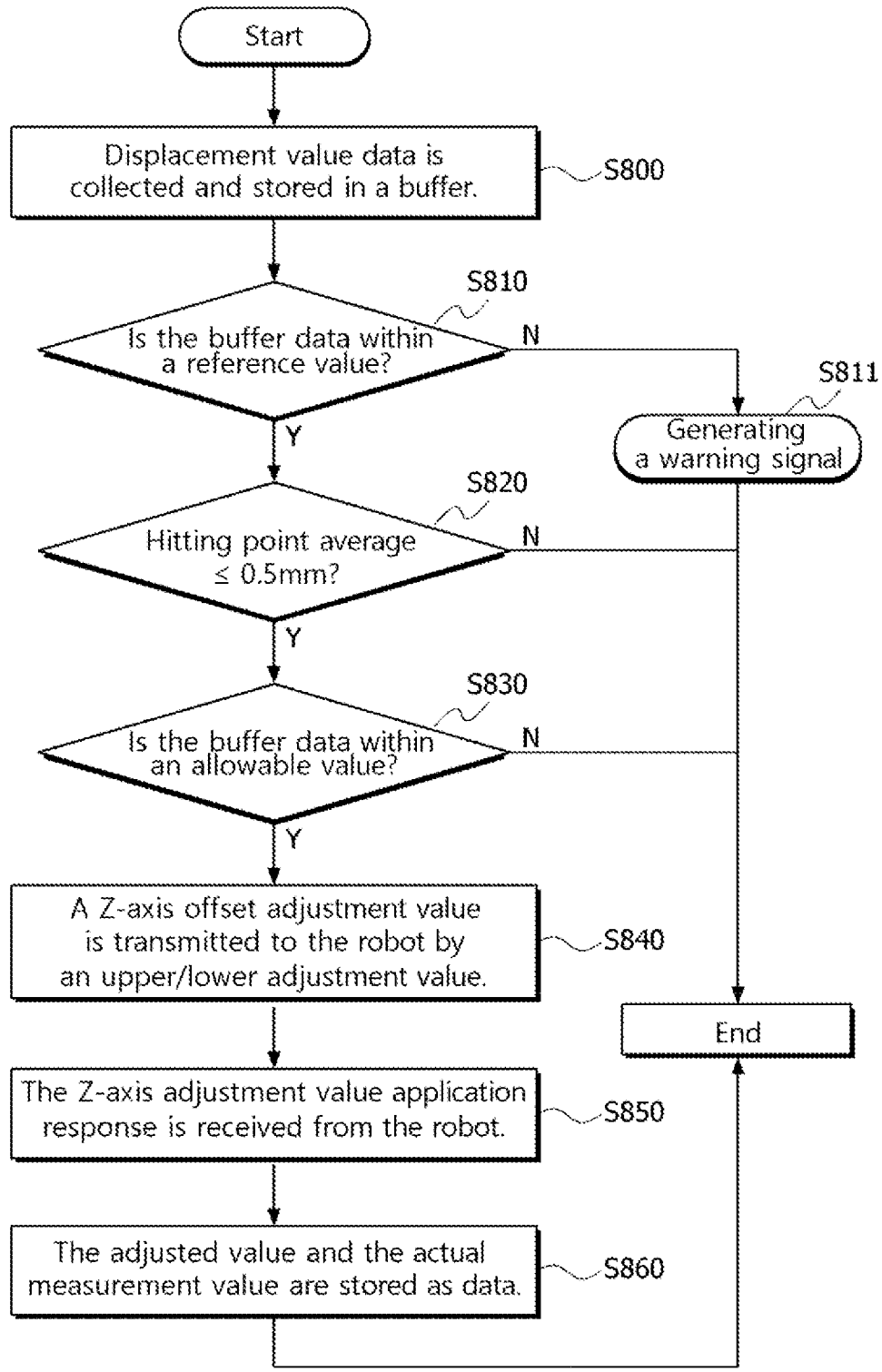

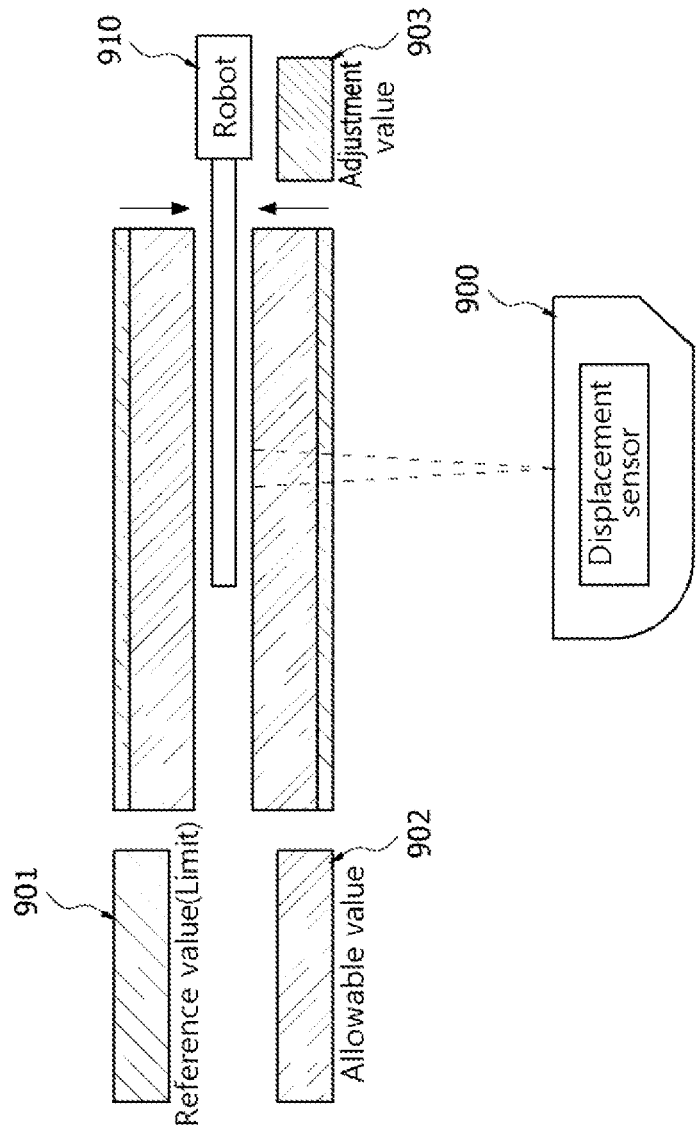
[Figure 9]

REBOT CONTROL METHOD USING NON-CONTACT DISPLACEMENT SENSOR AND APPARATUS THEREOF

TECHNICAL FIELD

The present invention relates to a robot control method using a non-contact displacement sensor, and an apparatus thereof, which is, more specifically, intended to provide a method for checking robot defects and enabling numerical correction without damaging a product surface using a non-contact displacement sensor.

BACKGROUND ART

In semiconductor and liquid crystal display products, robotic transfer is a repetitive motion in the form of performing a procedure which continuously moves a specific point. However, in a manufacturing process, manufacturing generally proceeds without interruption 24 hours a day, 365 days a year, so that when a problem occurs during product transfer, there is a problem that monitoring is difficult.

Particularly, in a method of using a robot, slight displacement distortion may occur depending on the robot's physical properties, fixation force, support force, and applied processing force of the product to be transferred during performing the transfer or processing process, and this slight displacement distortion may particularly have a significant impact on a work efficiency of an end effector performing precise work.

Therefore, to solve such a problem, a laser sensor for checking the displacement distortion of the end effector could be applied, but in the case of such a laser sensor, it was difficult to check the displacement distortion effect due to vibration, whereas in the case of a vibrating sensor, there was a problem to be a risk of product damage due to contact.

PRIOR ART DOCUMENTS

Patent Documents (Patent Document 1) KR Laid-Open Patent Publication No. 10-2021-0052778, May 11, 2021

DISCLOSURE

Technical Problem

It is a problem to be solved by the present invention to disclose a robot control method using a non-contact displacement sensor, and an apparatus thereof. More specifically, it discloses a method of controlling a robot so that when a problem occurs, it can be warned or corrected by using a method of detecting a displacement value due to level failure of a robot's end effector, and sending data to a server by means of a communication driver program to be managed, and an apparatus thereof.

Particularly, as the data sent to the server, the data fused by including video images and vibration monitoring sensors is used, whereby causal analyses and solutions may be provided.

The problems to be solved by the present invention are not limited to the problems as mentioned above, and other problems which are not mentioned will be clearly understood by those skilled in the art from the description below.

Technical Solution

To solve the above-described problem, a robot control method using a non-contact displacement sensor according to one example of the present invention may comprise steps of: checking a normal position according to a robot's motion range through the non-contact displacement sensor installed horizontally to an end effector of the robot; measuring displacement with respect to the end effector to obtain displacement data when a product is transferred by the robot; obtaining vibration data through a vibration sensor coupled to the robot; checking whether an abnormal state exists using the obtained displacement data and vibration data; and transmitting an adjustment value to correct displacement distortion of the robot when the robot is confirmed to be in the abnormal state.

Also, the step of correcting displacement distortion of the robot may further comprise a step of transmitting the adjustment value to the robot to correct the displacement distortion when the displacement distortion is within a predetermined range, and stopping the robot and providing a warning notification when the displacement distortion is above a predetermined range.

In addition, the step of checking whether an abnormal state exists may comprise steps of: fusing the displacement data and the vibration data to check whether the abnormal state is due to vibration; and omitting the step of correcting displacement distortion of the robot when the abnormal condition is due to vibration, and stopping the robot.

Furthermore, the robot control method using a non-contact displacement sensor may comprise a step of re-measuring the displacement distortion after adjusting the displacement distortion, and may further comprise a step of omitting the step of correcting displacement distortion of the robot when it is determined that the abnormal state exists in the re-measurement step, and stopping the robot.

Also, the step of checking a normal position may comprise steps of: adjusting a zero point to the fixed position of the displacement sensor; matching the displacement sensor, in which the zero point is adjusted, and the robot to each other; and checking the normal position of the displacement sensor for each robot based on the robot's motion range.

In addition, the displacement data may comprise displacements for at least four sample positions, and only when the average of the four sample positions is within a predetermined range, the adjustment value may be transmitted to correct displacement distortion of the robot.

Furthermore, the displacement data may comprise leveling data depending on the distance between the end effector and the displacement sensor, and in the step of correcting displacement distortion of the robot, the correction position of the robot may enable to be determined based on the leveling data without any level sensor.

Also, the step of checking whether there is an abnormality may comprise steps of: checking displacement data measured upon product transfer based on the normal position at least 20 times or more; and verifying a consistency state of the data through the log trace of the data checked 20 times or more.

A robot control apparatus using a non-contact displacement sensor according to one example of the present invention may comprise: a non-contact displacement sensor installed horizontally to an end effector of a robot, checking a normal position according to the robot's motion range, and measuring displacement with respect to the end effector to obtain displacement data when a product is transferred by the robot; a vibration sensor coupled to the robot to obtain vibration data; and a control part receiving the obtained displacement data and vibration data from the displacement sensor and the vibration sensor and transmitting a signal which controls the robot, wherein the control part may check whether the robot is in an abnormal state using the obtained displacement data and vibration data, and transmit an adjustment value to correct displacement distortion of the robot when the robot is confirmed to be in the abnormal state.

Also, the control part may transmit the adjustment value to the robot to correct the displacement distortion when the displacement distortion is within a predetermined range, and stop the robot and provide a warning notification when the displacement distortion is above a predetermined range.

In addition, the control part may fuse the displacement data and the vibration data to check whether the abnormal state is due to vibration, thereby controlling so that when the abnormal state is due to vibration, it omits the motion of correcting the displacement distortion of the robot, and stops the robot.

Furthermore, the control part may control to perform a motion of re-measuring the displacement distortion after adjusting the displacement distortion, and may omit the motion of correcting the displacement distortion of the robot when it is determined that the abnormal state exists in the re-measurement motion, and may stop the robot.

Also, to determine the normal position in the non-contact displacement sensor, the control part may control a motion of adjusting a zero point to the fixed position of the displacement sensor, a motion of matching the displacement sensor, in which the zero point is adjusted, and the robot to each other, and a motion of checking the normal position of the displacement sensor for each robot based on the robot's motion range.

In addition, the displacement data may comprise displacements for at least four sample positions, and the control part may control so that only when the average of the four sample positions is within a predetermined range, it transmits the adjustment value to correct displacement distortion of the robot.

Furthermore, the displacement data may comprise leveling data depending on the distance between the end effector and the displacement sensor, and the control part may determine the correction position of the robot based on the leveling data without any level sensor.

Other specific details of the present invention are included in the detailed description and drawings.

Effects of Invention

According to the present invention, the height value for each position of the product can be obtained using the non-contact displacement sensor, so that it does not damage the product at all, as well as even when a height difference occurs for each part of the robot, the number and time of equipment failures can be reduced due to the advantage that it is capable of immediate data transmission of the height difference to the server side in real time.

Particularly, by fusing data of the vibration sensor and the displacement sensor, the correlation between the displacement and the vibration can be analyzed and the displacement distortion caused by vibration can be comprehended, whereby it is possible to obtain material economic effects of resources such as time and manpower for analyzing the cause of the problem.

Moreover, when the level confirmation of the robot is required, or upon reinstalling the end effector, or setting up or relocating the equipment, the level can be adjusted using the displacement sensor, thereby enabling efficient level management without any additional level sensor.

The effects of the present invention are not limited to the effects as mentioned above, and other effects which are not mentioned will be clearly understood by those skilled in the art from the following description.

DESCRIPTION OF DRAWINGS

FIG. 1 is a view schematically explaining a robot control apparatus using a non-contact displacement sensor according to one example.

FIG. 2 is a flowchart for explaining a robot control method using a non-contact displacement sensor according to one example.

FIGS. 3a to 3c are views for explaining a method of checking displacement of an end effector using a non-contact displacement sensor according to one example.

FIG. 4 is a view for explaining a method of positioning a non-contact displacement sensor according to one example.

FIG. 5 is a view for explaining an appearance that a non-contact displacement sensor and a vibration sensor are mounted thereon according to one example.

FIG. 6 is a graph showing a correlation between a non-contact displacement sensor and a vibration sensor according to one example.

FIG. 7 is a view for explaining a measurement position of a non-contact displacement sensor according to one example.

FIG. 8 is a flowchart for explaining a correction motion of a robot control apparatus using a non-contact displacement sensor according to one example.

FIG. 9 is a diagram for explaining a range in which displacement of a non-contact displacement sensor according to one example can be adjusted.

MODE FOR INVENTION

The advantages and features of the present invention, and the methods for achieving the same will become clear by referring to examples to be described in detail below together with the accompanying drawings. However, the present invention is not limited to the examples disclosed below, but may be implemented in a variety of different forms, where the present examples are merely ensured that the disclosure of the present invention is complete, and provided to fully inform those skilled in the technical field, to which the present invention pertains, of the scope of the present invention, and the present invention is only defined by the scope of the claims.

The term used in this specification is for describing examples and is not intended to limit the present invention. In this specification, singular forms also include plural forms, unless specifically stated otherwise in the context. The "comprises" and/or "comprising" as used in the specification does not exclude the presence or addition of one or more other components in addition to the mentioned components. Throughout the specification, the same reference numeral refers to the same component, and the "and/or" includes each of the mentioned components, and all one or more combinations thereof. Although "first," "second," and the like are used to describe various components, it goes without saying that these components are not limited by these terms. These terms are merely used to distinguish one component from another component. Therefore, it goes without saying that the first component to be mentioned below may also be a second component within the technical idea of the present invention.

Unless otherwise defined, all terms (including technical and scientific terms) used in this specification may be used in meanings that can be commonly understood by those skilled in the technical field to which the present invention pertains. In addition, terms defined in commonly used dictionaries are not interpreted ideally or excessively, unless clearly specifically defined.

Hereinafter, examples of the present invention will be described in detail with reference to the attached drawings.

FIG. 1 is a view schematically explaining a robot control apparatus using a non-contact displacement sensor according to one example.

Referring to FIG. 1, a robot control apparatus (10) according to one example may comprise a displacement sensor (100), a control part (110), a management system (120), a vibration sensor (130), and an image sensor (140).

Communication methods such as Ethernet/IP, MODBUS, CC-Link, DeviceNet, EtherCAT, RS-232C, RS-485, RS-422, BCD output, PROFINET, and PROFIBUS may be supported between the sensors (100, 130, 140) and the control part (110). The network between the control part (110) and the management system (120) may support protocol connections of OPC-UA, SOAP, TCP/IP, SECS-I, SECS-II, HSMS, and SECS-GEM methods. To implement a network communication driver, the communication protocol that the communication driver must have may be appropriately provided, and the communication converter (111) exchanges serial, parallel, and digital/analog input/output signals with the sensors for communication between the sensors and a communication module, and connects the signals thus collected with the protocol to be connected to a network part (121) of the management system (120), whereby the communication connection may be controlled so that the data ultimately flows from the sensors to the server.

The displacement sensor (100) according to one example may be installed horizontally to an end effector of a robot, check a normal position according to the robot's motion range, and measure the displacement with respect to the end effector when the robot transfers a product, thereby transmitting the obtained data to the control part (110). Here, the displacement data may include the height (101), step (102), edge position (103), and width/diameter (104) of the end effector. For example, using the non-contact displacement sensor (100), the height may also be confirmed by obtaining the height value for each part of the product without damaging the product surface.

The vibration sensor (130) according to one example may be coupled to the robot to obtain vibration data, and transmit the obtained vibration data (131) to the control part (110).

The control part (110) according to one example may receive the displacement data and vibration data obtained from the sensors (100, 130), and transmit a signal for controlling the robot to the management system (120). For example, the control part (110) may check whether the robot is in an abnormal state using the obtained displacement data and vibration data, and control the robot so that when the robot is confirmed to be in the abnormal state, an adjustment value is transmitted thereto to correct its displacement distortion. In addition, the control part (110) may fuse the displacement data and the vibration data to check whether the abnormal state is due to vibration, thereby controlling so that when the abnormal state is due to vibration, it omits the motion of correcting the displacement distortion of the robot, and stops the robot.

Also, the control part (110) may control to perform a motion of re-measuring the displacement distortion after adjusting the displacement distortion, and omit the motion of correcting the displacement distortion of the robot when it is determined that the abnormal state exists in the re-measurement motion, and stop the robot.

In addition, to determine the normal position in the non-contact displacement sensor, the control part (110) may control a motion of adjusting a zero point to the fixed position of the displacement sensor (100), a motion of matching the displacement sensor (100), in which the zero point is adjusted, and the robot to each other, and a motion of checking the normal position of the displacement sensor (100) for each robot based on the robot's motion range.

Furthermore, the above-described displacement data may comprise leveling data depending on the distance between the end effector and the displacement sensor (100), and the control part (110) may determine the correction position of the robot based on the leveling data without any level sensor.

Meanwhile, the above-described control part (110) may comprise one or more processors and/or one or more memories. In addition, the memory may comprise a volatile and/or non-volatile memory. One or more memories may store commands to cause one or more processors to perform operations upon execution by one or more processors.

The management system (120) according to one example may be implemented by MES, FDC, and/or EAP. For example, the MES (Manufacturing Execution Systems) may mean a system to increase the efficiency of production management by handling production planning, work instructions, material requirements, production tracking, facility management, productivity performance analyses, and the like. The EAP (Equipment Application Program) may mean a system for building a solution responsible for equipment operation and control through system connection of production/measurement equipment and the MES. The FDC (Fault Detection and Classification) may be mainly implemented by a real-time equipment resource management and status inspection system, collect sensor values of equipment in real time to calculate them for monitoring equipment malfunctions in real time, and determine abnormalities and analyze defects. Therefore, in the case of the robot control apparatus (10) shown in FIG. 1, the control part (110) and the management system (120) have been shown as separate devices for convenience of explanation, but may really be implemented as a structure included in the FDC system.

Meanwhile, the robot control apparatus (10) according to one example may further comprise an image sensor (140). For example, a captured image (141) obtained from the image sensor (140) may be transmitted to the management system (120) to check for abnormalities in the robot using image analysis, or to analyze the cause when the abnormality occurs.

Hereinafter, the motions of the robot control apparatus (10) using a non-contact displacement sensor will be described in more detail with reference to FIGS. 2 to 10.

FIG. 2 is a flowchart for explaining a robot control method using a non-contact displacement sensor according to one example.

Referring to FIG. 2, in a step S200, the robot control method using a non-contact displacement sensor according to one example checks a normal position according to a robot's motion range through the non-contact displacement sensor installed horizontally to an end effector of the robot. For example, the step S200 may comprise steps of adjusting a zero point to the fixed position of the displacement sensor, matching the displacement sensor, in which the zero point is adjusted, and the robot to each other, and checking the normal position of the displacement sensor for each robot based on the robot's motion range.

Meanwhile, the displacement data may comprise displacements for at least four sample positions, whereby the height may also be checked by obtaining the height value for each part of the product.

In a step S210, the robot control method using a non-contact displacement sensor according to one example measures displacement with respect to the end effector to obtain displacement data when a product is transferred by the robot. Here, the displacement data may comprise leveling data depending on the distance between the end effector and the displacement sensor, and the correction position of the robot may be determined without any separate level sensor utilizing the leveling data when the displacement data of the robot is corrected.

In a step S220, the robot control method using a non-contact displacement sensor according to one example obtains vibration data through a vibration sensor coupled to the robot. Here, the obtained vibration data goes beyond the level of simple displacement distortion, whereby by fusing the data of the vibration sensor and the displacement sensor, it is possible to warn of the phenomenon of displacement distortion, and to determine the cause.

In a step S230, the robot control method using a non-contact displacement sensor according to one example determines whether the robot is in an abnormal state using the obtained data.

For example, it may be determined whether it is in the abnormal state through a method of checking displacement data measured upon product transfer based on the normal position of the end effector at least 20 times or more, and verifying a consistency state of the data through the log trace of the data checked 20 times or more.

If it is determined to be in the abnormal state, the process proceeds to a step S240, whereby by transmitting an adjustment value, it is possible to correct the displacement distortion of the robot. Meanwhile, according to one example, it may transmit the adjustment value to the robot to correct the displacement distortion only when the displacement distortion is within a predetermined range, and may also stop the robot and provide a user with a warning notification when the displacement distortion is above a predetermined range. The reason is because there may also be a defect in the machine rather than the simple displacement distortion when the displacement is distorted above a predetermined value. In addition, the displacement data comprises leveling data depending on the distance between the end effector and the displacement sensor, whereby in the step of correcting displacement distortion of the robot, the correction position of the robot may be determined based on the leveling data without any separate level sensor. Particularly, if the levelling data is used, the levels of the robot and the end effector may be determined using only the displacement sensor without the help of additional sensors or tools even if the end effector is replaced in the future.

Meanwhile, in the step S230, according to one example, it may fuse the displacement data and the vibration data to check whether the abnormality is due to vibration, and omit the step of correcting the robot displacement distortion if the abnormality is due to vibration, and immediately stop the robot and provide a user with a warning notification.

In addition, according to one example, in the step S230, the process returns to the step S210 after adjusting the displacement distortion, whereby it may re-measure the displacement distortion, and omit the step of correcting the displacement distortion of the robot when the abnormality is re-determined in the re-measurement step and stop the robot.

That is, the adjustment for displacement distortion may be allowed only once, and then it may be checked whether the robot has any problem.

FIGS. 3a to 3c are views for explaining a method of checking displacement of an end effector using a non-contact displacement sensor according to one example. FIG. 3a shows a side view of a semiconductor transfer device, FIG. 3b shows a front view of the semiconductor transfer device, and FIG. 3c shows a predicted actual installation view.

Referring to FIGS. 3a to 3c, the non-contact displacement sensor (300) according to one example is installed in parallel with the end effector (320) of the semiconductor transfer device (310) in a non-contact state. Here, the end effector means a device attached to the end of the robot arm to implement a desired robot automation process. In FIGS. 3a to 3c, the end effector (320) is a device for transferring a semiconductor wafer (330), which may be a blade-shaped device. Of course, the end effector (320) is not necessarily limited to such a device, and may include various devices with an adjustable position so that the wafer is disposed horizontally in parallel with the displacement sensor (300).

In more detail, FIG. 4 is a view for explaining a method of positioning a non-contact displacement sensor according to one example.

Referring to FIG. 4, a sensor bracket (401) and the displacement sensor (400) are fixed so that the laser direction of the displacement sensor (400) is directed upward. In this instance, the displacement sensor (400) and the end effector (420) of the robot (410) are fixed to be horizontal. At this time, it may be preferable that the position of the displacement sensor (400) is installed on the lower end so as not to interfere with surrounding devices while being located around an aligner (440). Because the displacement sensor (400) is installed on the lower end, it may be easier to determine the height of the end effector (420).

The vertical distance (405) between the end effector (420) and the displacement sensor (410) of the robot (410) according to one example may be in a range of 100 to 440 mm, and the horizontal distance (406) from the aligner (440) may be in a range of 100 to 500 mm. These are values based on the measurement range according to the type of sensor, where if the type of sensor changes, the distance limits may also change accordingly.

Meanwhile, the aligner (440) according to one example may be a processing tool used to transfer a pattern to a silicon wafer through exposure in a semiconductor process, and is not necessarily limited to this device. Meanwhile, the ranges of the vertical distance (405) and the horizontal distance (406) of the displacement sensor (400) as described above may be the optimal position for collecting data fused with data of the vibration sensor to be described below.

Meanwhile, if the displacement sensor (400) is mounted thereon, the zero-point position may be adjusted in conjunction with the robot (410), and the instantaneous height corresponding to a specific position in the robot moving section may be confirmed. According to one example, if the height measurement is completed at the zero point, the height value may be stored, and may be compared and analyzed by checking the data when the robot's end effector (420) moves again. Here, when the comparison value is less than the standard tolerance, it may indicate that there is no abnormality, and when the comparison value is greater than the standard tolerance, self-correction may be made, or a warning may be provided to a user.

Here, as a high-brightness laser and a MEMS (Micro. Electro Mechanical System) mirror are inserted inside the displacement sensor (400), it is possible to increase the detection capability of the sensor.

FIG. 5 is a view for explaining an appearance that a non-contact displacement sensor and a vibration sensor are mounted thereon according to one example, FIG. 6 is a graph showing a correlation between a non-contact displacement sensor and a vibration sensor according to one example, and FIG. 7 is a view for explaining a measurement position of a non-contact displacement sensor according to one example.

Referring to FIGS. 5 and 7, according to one example, the displacement sensor (500) fixed to the bracket (501) is installed in parallel with the end effector (520). Meanwhile, according to one example, the vibration sensor (511) may be coupled to a portion of the robot (510). The position where the vibration sensor (511) is coupled may be set to a good place to check the vibration of the end effector without affecting the exchange of the end effector.

To express the correlation between the vibration sensor and the displacement sensor in the graph of FIG. 6, the displacement change on the left vertical axis is expressed in a unit of mm, and the intensity of vibration on the right vertical axis is expressed in a unit of gal. In addition, the horizontal axis indicates the time point when measurement is performed in the displacement sensor and vibration sensor. Meanwhile, p1, p2, p3, and p4 are sample position values (hereinafter, defined as hitting points) measured in the non-contact displacement sensor, where the measurement positions according to one example are shown in FIG. 7. Meanwhile, referring to FIGS. 6 and 7, it can be known that the position where a vibration of 300 gal or more has occurred is in a state where at least one displacement of p1, p2, p3, and p4 has moved. For example, if the vibrations are distributed below 300 gal according to the displacement change within the normal motion range of the robot, the robot control apparatus according to one example may be classified as the normal state when the displacement is located between 375 mm and 395 mm, but the vibration is below 300 gal based on this correlation. On the other hand, the robot control apparatus according to one example is determined to be in an abnormal state (a state where displacement distortion is found) if the vibration is above 300 gal, but may be determined to be in a state capable of adjusting the position of the robot on its own based on whether the robot remains horizontal. For example, the states after the 14th measurement based on the x-axis of the graph in FIG. 6 may mean defective states. Therefore, it can be controlled so that the robot according to one example enables to adjust its position in states from 1 to 14 based on the x-axis, and the robot is stopped in states after that.

In addition, according to one example, if the average value of the hitting points p1, p2, p3, and p4 is within 0.5 mm, it is determined that the end effector of the robot remains horizontal, and only the height value is moved within a predetermined range, whereby the robot may be corrected to operate normally.

Of course, the normal range or the average value of hitting points as described above is not limited to such a value, and it may also be learned and determined to calculate a more appropriate value by means of machine learning using CNN (Convolution Nural Network), and the like. In addition, for the abnormal state confirmation, it is possible to verify whether there is any displacement distortion through mass inspection at least 20 times or more, and it is possible to increase the accuracy degree of the detection value through inspection of the robot and sensors.

Particularly, the robot control apparatus according to one example may determine the adjustment range by setting a reference value and an allowable value of the displacement value for whether the robot's position is in an adjustable state, and adjust the position of the end effector based on the adjustment value for the same. Hereinafter, it will be described below with reference to FIGS. 8 and 9.

FIG. 8 is a flowchart for explaining a correction motion of a robot control apparatus using a non-contact displacement sensor according to one example.

Referring to FIG. 8, the robot control apparatus according to one example collects displacement value data obtained from at least one displacement sensor in a step S800 to store them in a buffer.

In a step S810, it is determined whether the collected buffer data is within a reference value. Here, the reference value may mean a limit line where the robot is movable. If it exceeds the reference value, the process proceeds to a step S811, thereby generating a warning signal, and ending.

If it does not exceed the reference value, the process proceeds to a step S820, thereby checking whether a hitting point average obtained from the displacement sensor is within 0.5 mm. Here, the hitting point average may mean a sample value obtained from at least one displacement sensor, and in the case of the hitting point average, it is for checking whether the end effector and the displacement sensor are horizontal, which is not necessarily limited to such a value.

If the hitting point average is not within 0.5 mm, the robot cannot be adjusted, so that a warning signal is immediately generated and the process ends, and if the hitting point average is within 0.5 mm, the process proceeds to a step S830, whereby it is determined whether the buffer data is within an allowable value. Here, the allowable value may mean a range value that the robot is movable on the y-axis. If the buffer data is within the allowable value, the process moves to a step S840, whereby an offset adjustment value of the Z axis is transmitted to the robot by an upper or lower adjustment value. Then, in a step S850, a Z-axis adjustment value application response is confirmed from the robot, and in a step S860, the adjusted value and the actual measurement value are stored as data. Meanwhile, the measured values, reference values, allowable values, and adjustment values according to one example are stored in the form of level data, so that when the level confirmation of the robot is required, or upon reinstalling the end effector, or setting up or relocating the equipment, the level can be adjusted using the displacement sensor, thereby enabling efficient level management without any additional level sensor.

FIG. 9 is a diagram for explaining a range in which displacement of a non-contact displacement sensor according to one example can be adjusted.

Referring to FIG. 9, according to one example, the displacement sensor (900) may set a reference value (901) based on the measured z-axis position of the robot (910). When the reference value (901) is set, the robot (910) may determine the adjustable value from the reference value (901) to the current position of the robot as the allowable value (902). Therefore, when the displacement distortion of the robot (910) has been detected, the robot control apparatus using a non-contact displacement sensor according to one example may transmit the adjustment value (903) to the robot (910) if the adjustment value (903) that requires adjustment is within the allowable value (902), thereby controlling so that the robot (910) performs displacement adjustment according to the adjustment value. In addition, if the adjustment value (903) exceeds the allowable value (902), a warning signal may be generated without any separate adjustment motion to provide a user with an alarm.

According to the present invention, the height value for each position of the product can be obtained using the non-contact displacement sensor, so that it does not damage the product at all, as well as even when a height difference occurs for each part of the robot, the number and time of equipment failures can be reduced due to the advantage that it is capable of immediate data transmission of the height difference to the server side in real time.

Particularly, by fusing data of the vibration sensor and the displacement sensor, the correlation between the displacement and the vibration can be analyzed and the displacement distortion caused by vibration can be comprehended, whereby it is possible to obtain material economic effects of resources such as time and manpower for analyzing the cause of the problem.

The steps of the method or algorithm described in connection with examples of the present invention may be implemented directly in hardware, implemented as a software module executed by the hardware, or implemented by a combination thereof. The software module may also be resident in RAM (Random Access Memory), ROM (Read Only Memory), EPROM (Erasable Programmable ROM), EEPROM (Electrically Erasable Programmable ROM), flash memory, hard disk, removable disk, CD-ROM, or any type of computer-readable recording medium well known in the technical field to which the present invention pertains.

Here, examples of the present invention have been described with reference to the attached drawings, but those skilled in the technical field to which the present invention pertains will understand that the present invention can be implemented in other specific forms without changing its technical idea or essential features. Therefore, it must be understood that the above-described examples are illustrative, and are not restrictive in all respects.

EXPLANATION OF REFERENCE NUMERALS

100: displacement sensor
110: control part
120: management system
130: vibration sensor
140: image sensor
300: displacement sensor
310: transfer device
320: end effector
330: wafer
400: displacement sensor
401: bracket
410: robot
420: end effector
440: aligner
500: displacement sensor
510: robot
511: vibration sensor
520: end effector

The invention claimed is:

1. A robot control method using a non-contact displacement sensor, comprising steps of:
checking a normal position according to a robot's motion range through the non-contact displacement sensor installed horizontally to an end effector of the robot;
measuring displacement with respect to the end effector to obtain displacement data when a product is transferred by the robot;
obtaining vibration data through a vibration sensor coupled to the robot;
checking whether an abnormal state exists using the obtained displacement data and vibration data; and
transmitting an adjustment value to correct displacement distortion of the robot when the robot is confirmed to be in the abnormal state.

2. The method according to claim 1, wherein
the step of correcting displacement distortion of the robot further comprises a step of
transmitting the adjustment value to the robot to correct the displacement distortion when the displacement distortion is within a predetermined range, and
stopping the robot and providing a warning notification when the displacement distortion is above a predetermined range.

3. The method according to claim 1, wherein
the step of checking whether an abnormal state exists comprises steps of:
fusing the displacement data and the vibration data to check whether the abnormal state is due to vibration; and
omitting the step of correcting displacement distortion of the robot when the abnormal condition is due to vibration, and stopping the robot.

4. The method according to claim 1, wherein the robot control method using a non-contact displacement sensor comprises a step of
re-measuring the displacement distortion after adjusting the displacement distortion, and further comprises a step of omitting the step of correcting displacement distortion of the robot when it is determined that the abnormal state exists in the re-measurement step, and stopping the robot.

5. The method according to claim 1, wherein
the step of checking a normal position comprises steps of:
adjusting a zero point to the fixed position of the displacement sensor;
matching the displacement sensor, in which the zero point is adjusted, and the robot to each other; and
checking the normal position of the displacement sensor for each robot based on the robot's motion range.

6. The method according to claim 1, wherein
the displacement data comprises displacements for at least four sample positions, and only when the average of the four sample positions is within a predetermined range, the adjustment value is transmitted to correct displacement distortion of the robot.

7. The method according to claim 1, wherein
the displacement data comprises leveling data depending on the distance between the end effector and the displacement sensor, and
in the step of correcting displacement distortion of the robot, the correction position of the robot enables to be determined based on the leveling data without any level sensor.

8. A robot control apparatus, comprising:
a non-contact displacement sensor installed horizontally to an end effector of a robot, checking a normal position according to the robot's motion range, and measuring displacement with respect to the end effector to obtain displacement data when a product is transferred by the robot;
a vibration sensor coupled to the robot to obtain vibration data; and a control part receiving the obtained displacement data and vibration data from the displacement sensor and the vibration sensor and transmitting a signal which controls the robot, wherein the control part checks whether the robot is in an abnormal state using the obtained displacement data and vibration data, and transmits an adjustment value to correct displacement distortion of the robot when the robot is confirmed to be in the abnormal state.

9. The apparatus according to claim 8, characterized in that the control part transmits the adjustment value to the robot to correct the displacement distortion when the displacement distortion is within a predetermined range, and stops the robot and provides a warning notification when the displacement distortion is above a predetermined range.

10. The apparatus according to claim 8, characterized in that the control part fuses the displacement data and the vibration data to check whether the abnormal state is due to vibration, thereby controlling so that when the abnormal state is due to vibration, it omits the motion of correcting the displacement distortion of the robot, and stops the robot.

11. The apparatus according to claim 8, characterized in that the control part controls to perform a motion of re-measuring the displacement distortion after adjusting the displacement distortion, and omits the motion of correcting the displacement distortion of the robot when it is determined that the abnormal state exists in the re-measurement motion, and stops the robot.

12. The apparatus according to claim 8, characterized in that to determine the normal position in the non-contact displacement sensor, the control part controls a motion of adjusting a zero point to the fixed position of the displacement sensor, a motion of matching the displacement sensor, in which the zero point is adjusted, and the robot to each other, and a motion of checking the normal position of the displacement sensor for each robot based on the robot's motion range.

13. The apparatus according to claim 8, wherein the displacement data comprises displacements for at least four sample positions, and the control part controls so that only when the average of the four sample positions is within a predetermined range, it transmits the adjustment value to correct displacement distortion of the robot.

14. The apparatus according to claim 8, wherein the displacement data comprises leveling data depending on the distance between the end effector and the displacement sensor, and the control part enables to determine the correction position of the robot based on the leveling data without any level sensor.

15. A robot control program using a non-contact displacement sensor, combined with a computer, which is hardware, and stored in a non-transitory medium to execute the method of claim 1.

* * * * *